United States Patent [19]
Cohen et al.

[11] Patent Number: 5,551,001
[45] Date of Patent: Aug. 27, 1996

[54] MASTER-SLAVE CACHE SYSTEM FOR INSTRUCTION AND DATA CACHE MEMORIES

[75] Inventors: Earl T. Cohen, Fremont; Russell W. Tilleman, Palo Alto; Jay C. Pattin, Redwood City; James S. Blomgren, San Jose, all of Calif.

[73] Assignee: Exponential Technology, Inc., San Jose, Calif.

[21] Appl. No.: 267,658

[22] Filed: Jun. 29, 1994

[51] Int. Cl.⁶ .................................................. G06F 12/08
[52] U.S. Cl. .................... 395/449; 395/450; 395/455; 395/457; 395/459; 395/460; 395/462; 395/463; 395/467; 395/471; 395/473; 395/469
[58] Field of Search .................................. 395/450, 455, 395/457, 459, 460, 462, 463, 467, 471, 473, 469, 449

[56] References Cited

U.S. PATENT DOCUMENTS

| | | | |
|---|---|---|---|
| 4,467,414 | 8/1984 | Akagi et al. | 395/250 |
| 4,707,784 | 11/1987 | Ryan et al. | 395/467 |
| 5,019,971 | 5/1991 | Lefsky et al. | 395/250 |
| 5,023,776 | 6/1991 | Gregor | 395/449 |
| 5,136,700 | 8/1992 | Thacker | 395/449 |
| 5,155,824 | 10/1992 | Edenfield et al. | 395/470 |
| 5,155,828 | 10/1992 | Le Fetra et al. | 395/449 |
| 5,155,831 | 10/1992 | Emma et al. | 395/448 |
| 5,170,476 | 12/1992 | Laakso et al. | 395/467 |
| 5,179,679 | 1/1993 | Shoemaker | 395/445 |
| 5,201,041 | 4/1993 | Bohner et al. | 395/465 |
| 5,202,969 | 4/1993 | Sato et al. | 395/470 |
| 5,212,781 | 5/1993 | Shah | 395/449 |
| 5,249,282 | 9/1993 | Segers | 395/449 |
| 5,276,848 | 1/1994 | Gallagher et al. | 395/448 |
| 5,283,890 | 2/1994 | Petolino et al. | 395/449 |

OTHER PUBLICATIONS

Blasco et al., "Inspection Cache Buffer With Program–Flow Control". Originally Published As U.S. Pat. No. 5,131,088.

*Primary Examiner*—Tod R. Swann
*Assistant Examiner*—James Peikari
*Attorney, Agent, or Firm*—Stuart T. Auvinen

[57] ABSTRACT

A master-slave cache system has a large, set-associative master cache, and two smaller direct-mapped slave caches, a slave instruction cache for supplying instructions to an instruction pipeline of a processor, and a slave data cache for supplying data operands to an execution pipeline of the processor. The master cache and the slave caches are tightly coupled to each other. This tight coupling allows the master cache to perform most cache management operations for the slave caches, freeing the slave caches to supply a high bandwidth of instructions and operands to the processor's pipelines. The master cache contains tags that include valid bits for each slave, allowing the master cache to determine if a line is present and valid in either of the slave caches without interrupting the slave caches. The master cache performs all search operations required by external snooping, cache invalidation, cache data zeroing instructions, and store-to-instruction-stream detection. The master cache interrupts the slave caches only when the search reveals that a line is valid in a slave cache, the master cache causing the slave cache to invalidate the line. A store queue is shared between the master cache and the slave data cache. Store data is written from the store queue directly in to both the slave data cache and the master cache, eliminating the need for the slave data cache to write data through to the master cache. The master-slave cache system also eliminates the need for a second set of address tags for snooping and coherency operations. The master cache can be large and designed for a low miss rate, while the slave caches are designed for the high speed required by the processor's pipelines.

16 Claims, 11 Drawing Sheets

MASTER-SLAVE CACHE SYSTEM FOR INSTRUCTION AND DATA CACHE MEMORIES

BACKGROUND OF THE INVENTION—FIELD OF THE INVENTION

This invention relates to cache memory systems, and more particularly to a masterslave cache system.

BACKGROUND OF THE INVENTION—DESCRIPTION OF THE RELATED ART

Memory access delays have not been reduced as quickly as have logic delays within central processing units (CPU's) or microprocessors. These logic delays within microprocessor pipelines have been reduced with new design techniques such as super-scalar design, where two or more pipelines can operate in parallel to effectively process two or more instructions in each clock cycle. Reduced instruction set computer (RISC) systems simplify the pipeline, allowing the clock to be run at a still higher frequency. Thus newer processors require a higher bandwidth for both instructions and data operands to satisfy multiple pipelines operating at higher frequencies.

A memory hierarchy is often set up, in which a few small registers lie within the microprocessor core. A small level-1 cache memory is placed on the microprocessor die, and a level-2 cache memory on the system board, with dynamic RAM (DRAM) comprising the large main memory. Maintaining coherency between each of these levels in the memory hierarchy can be difficult and can slow down the cache memories in particular. Prefetching of instructions can also increase the complexity of the cache and slow down the cache.

The trend in recent years has been to put a level-1 cache on the microprocessor die. As the processor pipeline becomes faster, the level-1 cache size has been increased to increase the hit rate of the level-1 cache. A high hit rate is necessary because the miss penalty is high, requiring that a slower off-chip level-2 cache or main memory be accessed. Often the level-1 cache is made multi-way set-associative to improve its hit rate. This has led to larger and more complex on-chip caches. However, the larger and more complex the cache becomes, the more difficult it becomes to make the cache fast enough to meet the bandwidth of the processor pipelines, as shown in FIG. 1. As cache size is increased, the miss rate 12 decreases. However, the raw access time 10 to retrieve data from the cache increases with the cache size and associativity because of the larger delays from the longer signal-line traces and capacitive delays from additional memory cells. For a pipeline operating at 66 Mhz, and requiring one instruction and one data operand per cycle, data must be accessed from the cache every 7.5 nanoseconds (ns). However, this 7.5 ns access time 14 sets an upper limit 16 of 2K for the cache size for the example of FIG. 1. The 2K cache will therefore have a higher miss rate 18 due to the need for the fast access time.

A "Harvard" architecture is often needed to meet the bandwidth required by the two main pipelines—one for instructions and a second pipeline for data operands. These pipelines may be connected together within the processor core or they may be separate. For example, the instruction pipeline may decode instructions and feed an execution pipeline with decoded instructions, while the data pipeline also sends data operands to the execution pipeline. Alternately, a branch-instruction pipeline may be used to process branch instructions only, and would not feed decoded branch instructions to the execution pipeline.

The Harvard architecture of FIG. 2 shows a main memory 34 supplying a processor core 20. Two separate caches are provided in the Harvard architecture, one cache 15 to supply the instruction pipeline 22, with a second cache 17 to supply data operands to the execution pipeline 24. However, this architecture is not flexible because fixed caches must be provided for data and instructions rather than having both share the same cache. A single, unified cache is more flexible because the percentage of the cache apportioned for instructions or data can vary over time, depending on the requirements of programs being executed. Providing two separate sets of address and data buses and pins 13, 11 for connection to off-chip data and instruction caches would also be expensive. If only one set of pins is provided, then both the instruction cache 15 and the data cache 17 must contend for the same set of pins which may become a bottleneck. In addition, coherency can be a problem, especially when data operands are stored to the instruction stream. Coherency requests, or "snoops" must usually be sent to both caches. Large, complex separate caches, even though smaller than a unified cache, are often required.

On-chip caches are becoming more of a bottleneck to processor performance. They need to be larger and more complex because the off-chip miss penalty is becoming relatively higher. Processor technology allows for rapid increases in pipeline speed but off-chip memory access times have been unable to achieve commensurate speed increases. However, larger, more complex caches are not as fast as smaller, simpler caches, and may not be able to match the processor's pipeline clock rate and maximum bandwidth.

What is desired is a caching scheme that will provide the benefits of large on-chip caches with low miss rates, but also offer the speed advantage of small, simple caches. It is also desired to provide for complex cache management operations such as prefetching, snooping, and cache coherency without creating a bottleneck for the processor's pipelines.

SUMMARY OF THE INVENTION

A master-slave caching scheme includes a larger master cache that provides a low miss rate, and supports all prefetching and cache coherency operations. The master cache controls two smaller slave caches, a slave-instruction cache and a slave-data cache. The master cache includes valid bits for the slave caches, and will instruct the slave caches to invalidate a line when a coherency hit is detected by the master cache. A store to the instruction stream will cause the master cache to instruct the slave instruction cache to invalidate the corresponding line in the slave-instruction cache.

The instruction and data slave caches are kept small and simple so that they can match the bandwidth required by their respective pipelines. The master cache is tightly coupled to the slave caches which results in a low miss penalty for a slave cache miss that hits in the master cache. Thus the slave caches provide the high bandwidth required by the pipelines, while the master cache provides a low miss rate with a large size and associative organization.

The master-slave cache system is for transferring data between a main memory and a central processing unit (CPU). The CPU has an instruction pipeline and an execution pipeline, while the main memory stores a plurality of data operands and a plurality of instructions. The instruction pipeline decodes instructions at a first rate, while the execution pipeline is executing at a second rate. The system comprises a master cache for storing data operands and instructions. The master cache is coupled to the main memory and stores a first subset of the plurality of data operands and a second subset of the plurality of instructions stored in the main memory.

A slave instruction cache is coupled to the master cache and is coupled to the instruction pipeline. It stores a third subset of the instructions stored in the master cache, the third subset being a subset of the second subset. The slave instruction cache is capable of transferring instructions to the instruction pipeline at the first rate.

A slave data cache is coupled to the master cache and is coupled to the execution pipeline. It stores a fourth subset of the data operands in the master cache, the fourth subset being a subset of the first subset. The slave data cache is capable of transferring data operands to the execution pipeline at the second rate.

The slave instruction cache matches the instruction transfer rate required by the instruction pipeline, while the slave data cache matches the data-operand transfer rate required by the execution pipeline. The overall miss rate of the master-slave cache system is improved by the larger capacity of the master cache, while the processor's bandwidth requirements are satisfied by the slave caches.

In another aspect of the invention, an invalidation means coupled to the master cache invalidates data words in both the master cache and the slave caches. The master cache contains master tags that include valid bits for the slaves. Thus all invalidation, snoop, and cache management operations are handled by the master cache, which signals to the slave caches to invalidate a line only after a matching line has been detected as being present in the slave cache. Thus the searching that is required by cache management operations is performed by the master cache for the slave caches, freeing the slave caches of the added complexity and bandwidth loss.

DETAILED DESCRIPTION

The present invention relates to an improvement in cache organization. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

MASTER-SLAVE CACHE ARRANGEMENT

A cache on the same substrate or die with a microprocessor can supply the maximum bandwidth of the processor's pipelines while being large enough to have a low miss rate. The cache is arranged as a large master cache which controls two smaller slave caches, one slave instruction cache for supplying the instruction pipeline with instructions, and a second slave data cache for supplying data operands to the execution pipeline.

Figure 3:
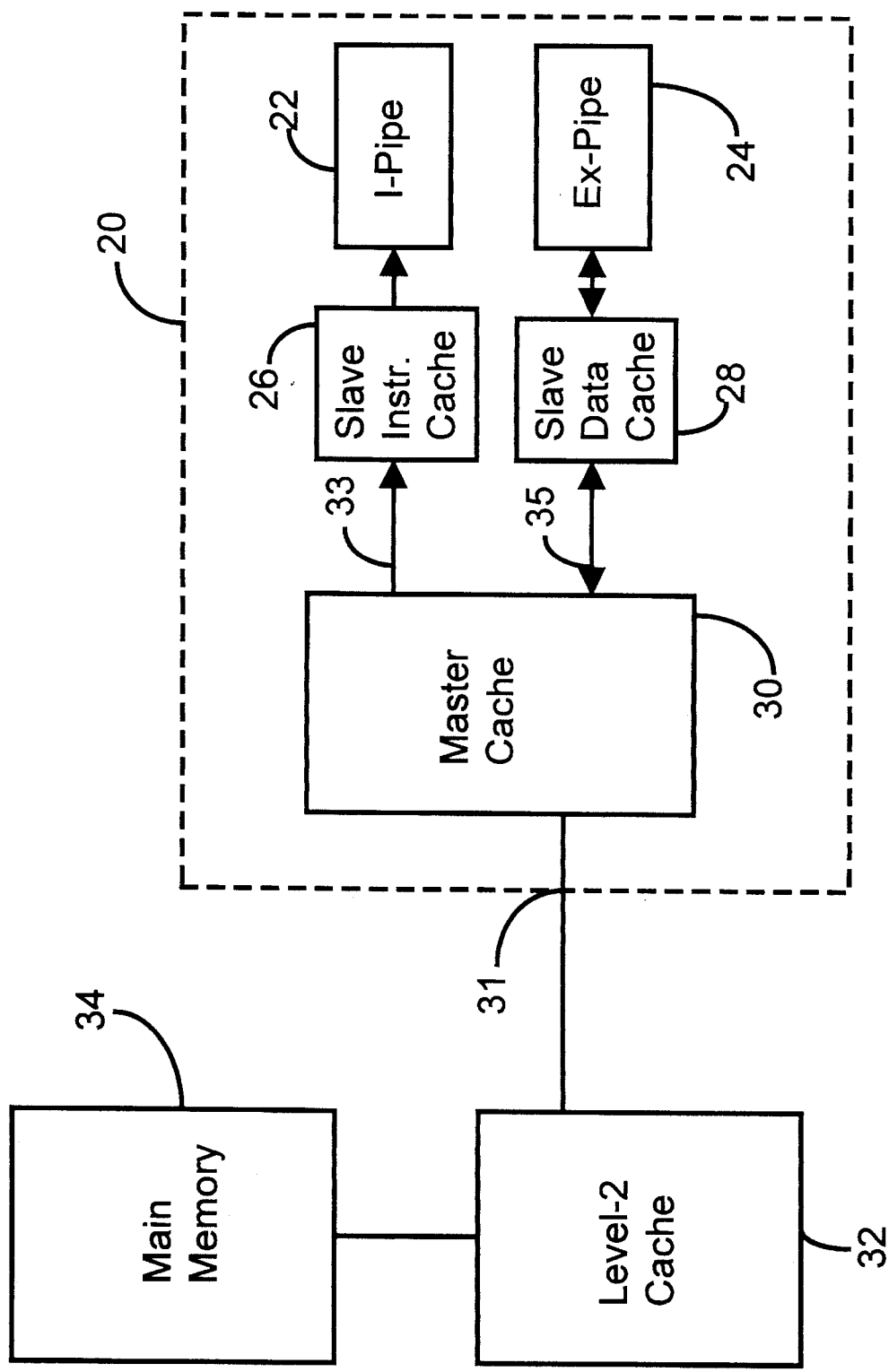
FIG. 3 illustrates a microprocessor employing the master-slave cache.

FIG. 3 illustrates a microprocessor substrate or die 20 containing the master-slave cache. Instruction pipeline 22 is supplied with instructions by slave instruction cache 26. The instruction pipeline 22 is clocked by a processor or pipeline clock. The pipeline clock controls the transfer of instructions from one stage of the pipeline to the next. One or more instruction words must be provided for each processor clock period. Although the instruction pipeline 22 may stall, or occasionally require more than one processor clock period for an instruction word, the maximum or full bandwidth when no stalls occur is n instruction words per processor clock period, where n is the level of scalarity. Thus the slave instruction cache 26 must supply the instruction pipeline 22 with at least n instruction words per processor clock period if the full bandwidth of the processor is to be achieved. A super-scalar processor capable of executing 2 instructions per clock period would have n=2.

A simplified embodiment is described having a single instruction pipeline and a single execution pipeline. However, most modern processors employ super-scalar designs. Super-scalar CPU's have several pipelines. A three-way super-scalar embodiment would require three instructions for each clock period to supply three pipelines. If two of the pipelines are execution pipelines capable of executing memory operations, then two data operands may also need to be supplied for each clock period. The teachings of the detailed description will be restricted to a simple CPU having a single execution pipeline and a single instruction pipeline. These teachings may however be extended to multiple pipelines by persons skilled in the art.

The execution pipeline 24 is supplied with operands from slave data cache 28. In one embodiment of the invention execution pipeline 24 may also store data operands into slave data cache 28; these data operands are then written through to master cache 30. Master cache 30 provides all the cache management necessary for itself and the slave caches 26, 28. Slave caches 26, 28 need only have a valid bit with each tag which is set and cleared by the master cache 30. Prefetching, handling external snoop requests, coherency operations, and cache flushes are all accomplished by the master cache. Thus the slave caches 26, 28 may be kept simple, allowing for a fast access time and a high bandwidth. Master cache 30 is significantly larger and more complex than would be possible if it were to directly supply the processor's pipelines 22, 24. Directly supplying the pipelines in a single processor clock requires a fast access time. Slave caches 26, 28 are small, fast and simple, and are preferably implemented as RAM-based, direct-mapped caches, while master cache 30 is preferably RAM-based and set-associative. Master cache 30 preferably has four or more times the capacity of both the slave caches 26, 28. Master cache 30 may require multiple processor clock periods to access its contents, while the slave caches 26, 28 are small enough to supply the required data operand and instruction words each processor clock period. An additional level-2 cache 32 may be provided on the system board off the microprocessor die 20, or the level-2 cache 32 may be omitted, and misses from the master cache passed on to the main memory 34 on the system board. The high-bandwidth benefit of the Harvard architecture is obtained because the slave instruction cache 26 and slave data cache 28 can supply both pipelines 22, 24 as did the split instruction and data caches 15, 17 of the Harvard architecture of FIG. 2. However, two sets of address and data buses and pins 13, 11 are not required. If the prior-art Harvard architecture is used with only a single set of pins, the pins must be multiplexed between the two caches 15, 17. The two caches 15, 17 must be made large so that the miss rate is small, otherwise the two caches 15, 17 will be contending for the multiplexed pins frequently, causing one cache to have to wait. However, the larger cache sizes reduces the clock rate and bandwidth that can be supplied to the processor core. The prior-art Harvard architecture is thus stuck between the trade-off of larger size and lower bandwidth, or smaller cache size and higher bandwidth but pin contention or die cost.

In the invention, master cache 30 provides more functionality than is the case by merely integrating an additional level of caching on the microprocessor die 20. Master cache 30 is tightly coupled to slave caches 26, 28 and can relieve the slave caches 26, 28 from burdensome cache management operations such as coherency and snooping. In the Harvard architecture of FIG. 2, coherency between instruction cache 15 and data cache 17 is difficult and may require that clock cycles be taken that would otherwise be used to supply the pipelines 22, 24. In the invention, the master cache 30 absorbs these coherency requests, freeing the slave caches to supply the processor's pipelines.

Additionally, the slave caches 26, 28 may be physically located in close proximity to the pipelines 22, 24. Thus slave instruction cache 26 is located near to the instruction pipeline 22, while the slave data cache 28 is located near the execution pipeline 24. The larger master cache 30 may then be located at a greater distance from the pipelines 22, 24 and the core CPU logic. This simplifies floor-planning and layout of the microprocessor die 20, and results in faster access times for transferring instructions and data from the slave caches 26, 28 to the pipelines 22, 24. In prior-art systems, the large cache sizes required that any cache be located away from the CPU core and the pipelines.

Only a single set of address and data busses are needed for communicating with external caches and memories. Pins 31 connect the master cache 30 with the external level-2 cache 32, whereas on some prior-art systems a single set of pins had to be multiplexed. Not having to multiplex the pins reduces contention and complexity. A larger, wider data path may be used between the master cache 30 and the slave caches 26, 28 since no connection is necessary for the slave-master busses 33, 35 to the external pins of the microprocessor die 20. Slave-master busses 33, 35 may be each separately optimized for the bandwidth required by the particular slave cache and pipeline.

Since the bulk of the capacity of the cache lies in the master cache 30 rather than the slave caches 26, 28, the benefits of the unified cache result. A higher hit rate is achieved than if the master cache were split into two separate half-size caches, and the master cache provides flexibility and adaptability by being able to place either instruction or data words in any line in the cache, allowing the portion of the cache allocated to either data or instructions to vary as needed by the programs currently executing on the processor. The master cache may be implemented in slower, denser, and lower-power memory than the slave caches, saving power, space and cost while maintaining a high hit rate.

MASTER TAGS INCLUDE SLAVE VALID BITS

Figure 1:
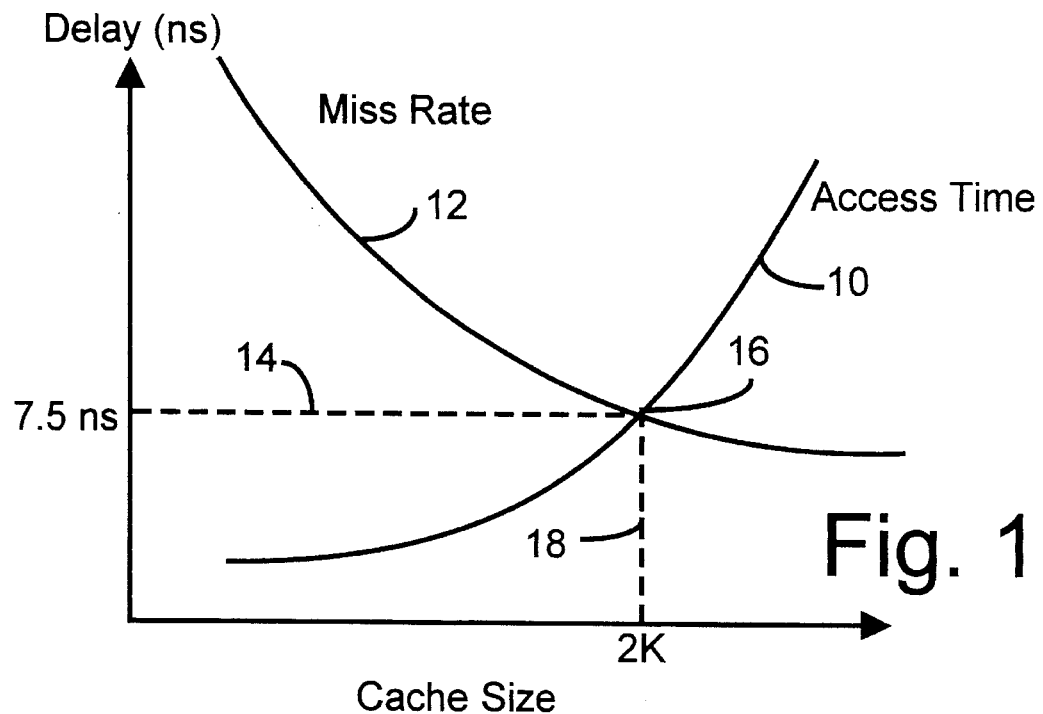
FIG. 1 is a graph of the relationship between cache size, miss rate, and access time.
Figure 4:
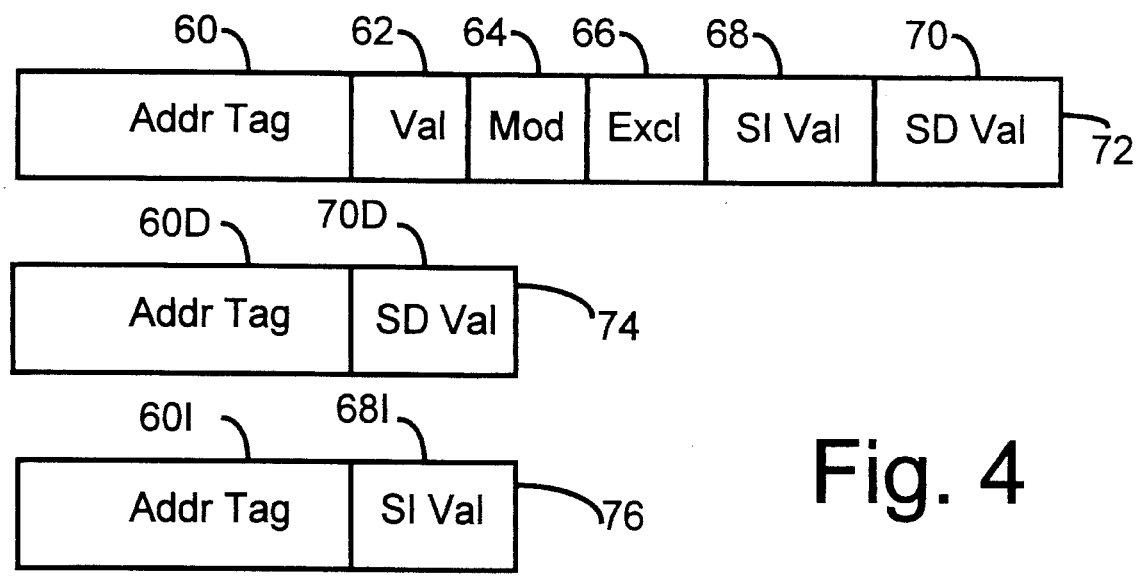
FIG. 4 is a diagram of the tags stored in the master-slave cache.

FIG. 4 shows the tags stored with each line in the master-slave cache. A master tag 72 is stored for each line in the master cache 30. An address tag 60 stores a portion of the address of the data stored in the line. The data fields of the line are not shown but are well-known in the art and can take on many arrangements. The data stored may be either data operands, instructions, or translation or other system information. A master valid bit 62 is used to indicate if the line in the master cache 30 contains valid data. A modified bit 64 is used when a write-back policy is desired and indicates that the processor has written data into the cache line. Before the modified line is purged from the cache and replaced, the line must be copied or written back to external memory, or at least loaded into a temporary write-back buffer, before new data and a new tag address can be loaded into the cache line.

Exclusive bit 66 allows for more complex cache-coherency schemes. If exclusive bit 66 is set, it indicates that no other caches in the system may have a copy of that particular line. The exclusive bit is particularly useful in multi-processor systems and can be used to help implement the MESI (modified, exclusive, shared, invalid) standard for cache-coherency.

Master tag 72 also contains a copy of the valid bits in the slave caches 26, 28. SI Valid bit 68 is a copy of the slave instruction cache's valid bit for that same line, while SD valid bit 70 is a copy of the slave data cache's valid bit. Thus the master cache has information on the contents of the slave caches.

A particular line in the master cache is selected by breaking an address into a tag portion and an index portion. The index portion selects a subset of the lines in the cache while the tag portion is stored in the address tag field 60 of the master tag 72. This is a well-known technique in the art. Since the slave caches 26, 28 are smaller, having fewer cache lines, several lines in the master cache will correspond to each line in the slave cache. Since the master cache is set-associative, the several lines corresponding, or mapping into a single line in the slave caches may all have the same index portion of the address in the master cache. The number of address bits in the master and slave tags will be identical if the master cache is designed so that each column has a size equal to the size of the slave cache. An 8-way associative master cache that has 2K bytes in each column would have a total size of 16K. If the slave caches were chosen to be 2K bytes, then the address tags in the slave caches could have the same number of bits as the tags in the master.

Figure 12:
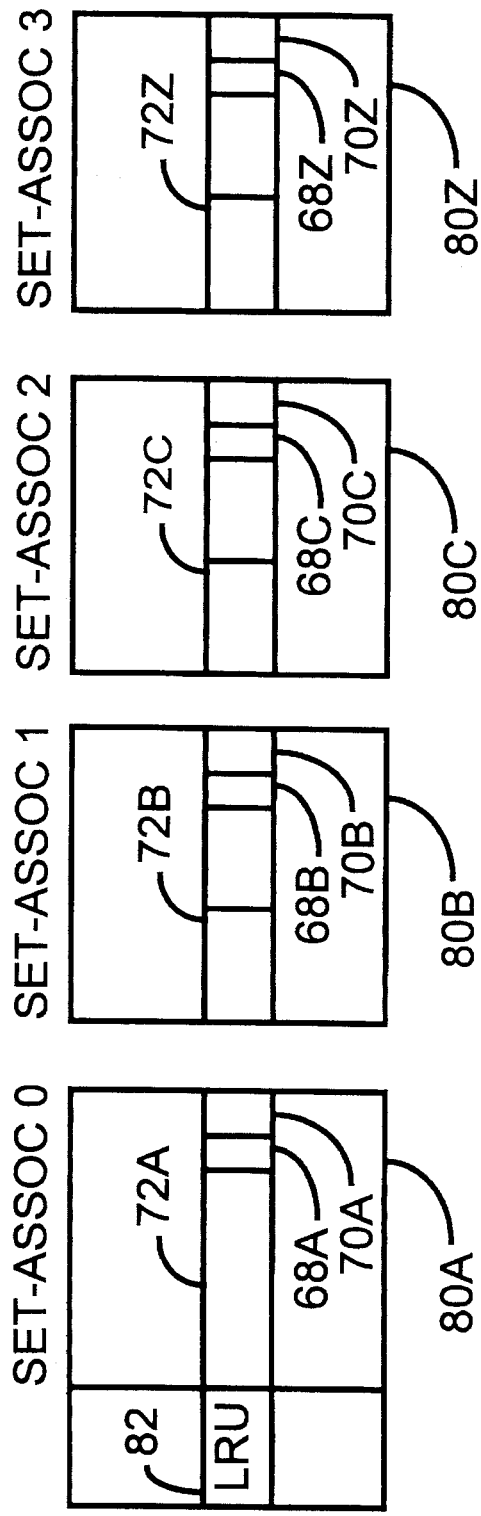
FIG. 12 is a set-associate master cache with a common LRU field.

In a preferred embodiment, the master cache is set-associative, as shown in FIG. 12. A least-recently used algorithm is used to determine which set-associate, 80A, 80B, 80C, 80Z to replace when a new line is allocated into the master cache and all sets store valid data. Additional least-recently-used (LRU) bits 82 are stored in a common tag field which contains LRU information for all set-associate lines having the same index. These LRU bits 82 are stored with each set to keep track of which set-associate in the set was used least recently. Normally, this least-recently used set-associate would be replaced. However, if this least-recently-used set-associate has a slave valid bit set, indicating that the line is also present in a slave cache, then this line will not be replaced. Instead, the 2nd least-recently-used set-associate will be replaced, leaving the LRU set-associate in the cache.

Thus when the LRU bits are consulted to select which set-associate and line should be replaced to make room for a new line, the slave cache valid bits 68A, 68B, 68C, 68Z, 70A, 70B, 70C, 70Z, are also consulted. Any line having a slave cache valid bit set would not be replaced, even if it is the least-recently used line. The slave cache lines are always kept in the master cache in this manner. A line must first be purged from the slave cache before it can be a candidate for replacement in the master cache.

Another approach for line replacement is to force the set-associates having a slave valid bits set to be the most-recently-used set-associates. The LRU field may consist of subfields, one for each set-associate, making a stack. When a set-associate is referenced, it is placed on the top of the stack as the most-recently used, while the others are shifted down the stack. The set-associate on the bottom of the stack is the least-recently used and the first to be replaced. Any set-associates having a slave valid bit set would be placed on the top of the stack and could not be shifted out of their most-recently-used (MRU) positions except by another set-associate having the other slave valid bit set. Thus the set-associates having the slave valid bit set would always be kept MRU, or next-MRU.

Data slave tag 74 of FIG. 4 also includes an address tag 60D, which may contain more address bits than the address tag 60 in the master cache because a smaller index width may be needed to access the fewer lines in the slave data cache. A single valid bit, the SD valid bit 68D, is needed for each set-associate to indicate if the line is valid in the slave data cache.

Instruction slave tag 76 includes an address tag 60I, which may contain more address bits than the address tag 60 in the master cache because a smaller index width may be needed to access the fewer lines in the slave cache. A valid bit, the SI valid bit 68I, is needed to indicate if the line is valid in the slave instruction cache.

Thus the master cache contains three valid bits: the master valid bit 62 which indicates if the line in the master cache is valid, and the SI valid bit 68 for the slave instruction cache and the SD valid bit 70 for the slave data cache. The master cache always contains a copy of any lines in the slave caches; it is not permitted for the slave caches to have lines which are not present in the master cache. By also having a copy of the slave cache's valid bits, the master can perform complex coherency operations such as snoops, invalidations, and zeroing, required by many modern architectures, without needlessly disturbing the slave caches.

A zeroing operation causes binary zeros to be written to all data locations in a line. For a line that has many sub-blocks of data, the writing of zero to all sub-blocks may take many clock cycles. When the master finds a line that is present in one of the slave caches, indicated by the copy of the slave's valid bit in the master tag 72, the master causes the slave to invalidate that particular line in the slave, even though an invalidation is not being performed. A simple invalidation is possible if the slave data cache is write-through, always staying consistent with the master cache.

The master will perform all the searching and data zeroing, and the master will detect hits in the slave caches, while the slave caches merely have to invalidate a line when instructed to do so by the master cache. This is a significant savings in bandwidth for the slave caches. Since this searching is performed only by the master cache, loops may be coded in software or hardware for searching the contents of the cache line-by-line. The slave caches are interrupted only when the search in the master cache detects a line present in the slave. If an action is required, rather than perform that action on the line in the slave cache, the master merely invalidates the line in the slave cache. Some types of cache coherency operations may not require invalidation. For example, some snoops may only be checking to see which lines are present in a cache, but do not request any invalidations.

SLAVE MISS

Figure 5:
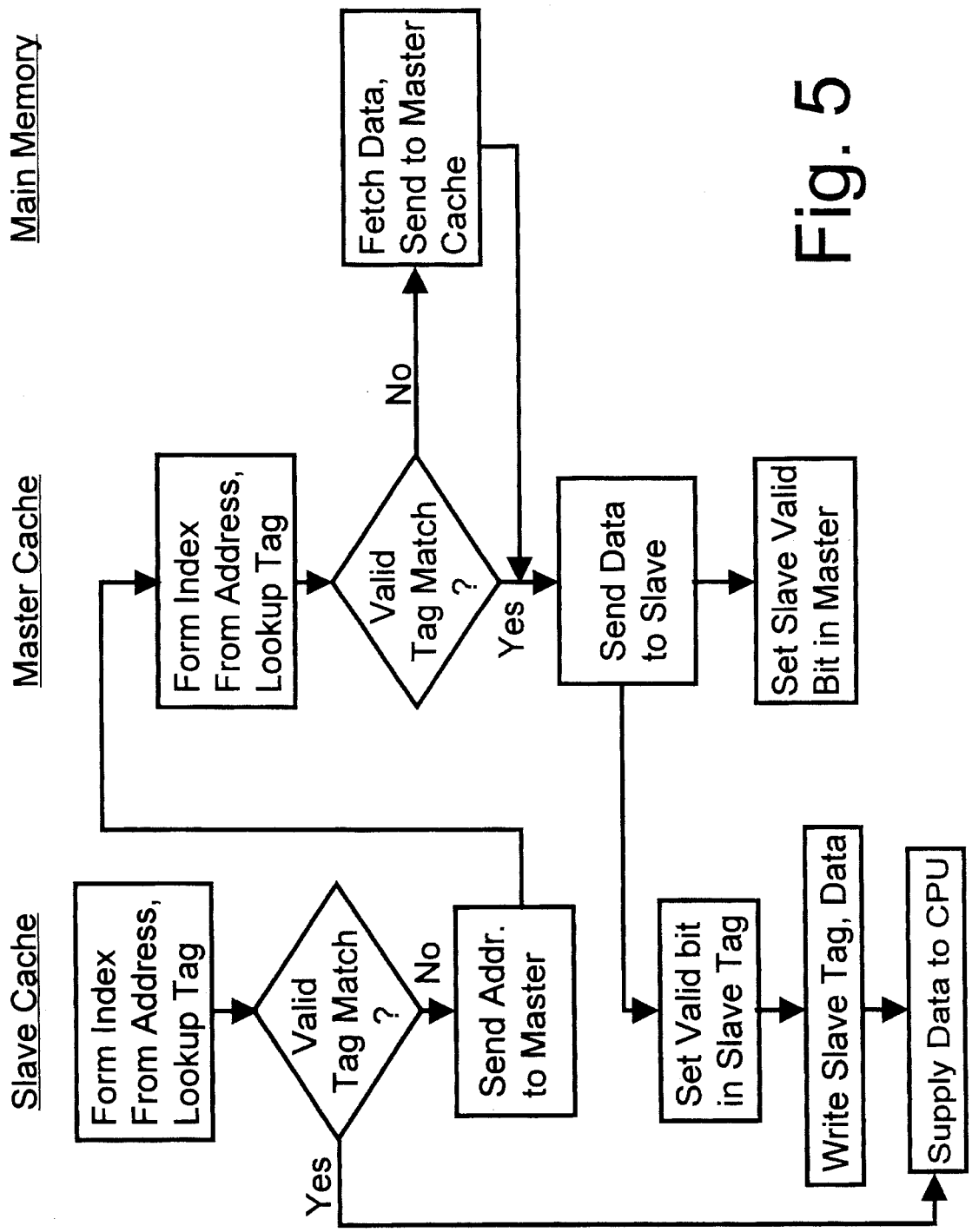
FIG. 5 is a is a flowchart of the basic sequence of operations when one of the pipelines accesses data or an instruction from one of the slave caches.

FIG. 5 is a flowchart illustrating the basic sequence of operations when one of the pipelines accesses data or an instruction from one of the slave caches. The slave cache receives the address from the pipeline and breaks the address into an index portion and a tag portion. The index portion is used to select a single line in the slave cache if the slave cache is direct-mapped, or a subset of lines if the slave is set-associative. The address tag field from the selected line or lines is then compared to the tag portion of the address. If a match results, and the slave's valid bit indicates that the line is valid, then the data stored in the matching line in the slave cache is simply supplied to the pipeline.

However, if none of the address tags match the tag portion of the address, or if the slave's valid bit indicates that the matching line is not valid in the slave cache, then the data must be fetched from the master cache. The slave cache sends the address to the master cache, which also breaks the address into a tag portion and an index portion, although these portions may not be exactly the same as those for the slave since the larger master cache may require more address bits for the index portion than the slave cache did. The master cache uses the tag portion of the address to select a subset of lines in the master cache (multiple lines if the master cache is set-associative). Each address tag field 60 from each selected line is then compared with the tag portion of the address. If a match is found and the master valid bit 62 is set, then the matching line is selected, and the data is sent to the slave cache and the pipeline. If no match is found, then the address is sent off-chip to the main memory 34 or the level-2 cache, which supplies the data, and the data is placed in one of the lines of the master cache and sent to the slave cache and pipeline. The SI or SD valid bit is set in the master to indicate for future accesses that the slave cache now has a copy of the data in the line.

Data from the master cache is written by the master cache into the slave cache line selected by the index portion of the address, and sets the valid bit in the slave cache. The master cache also writes the tag portion of the address to the slave cache's address tag, to reflect the new address for the line. A bypass may be provided to route the data from the master cache directly to the pipeline so that the processor's pipeline does not have to wait for the data to be first written to the slave cache. This bypass is not shown in FIG. 5 for the sake of simplicity.

Additionally, when the master cache supplies data to the slave cache, the master cache must clear the SI or SD valid bits 68, 70 stored in the master cache for the old line being replaced in the slave cache. An extra invalidate cycle to clear the old SI or SD valid bit in the master cache may be performed with the old address from the slave cache. During a miss, the slave caches 26, 28 may send a portion of their old address tags back to the master cache to allow the master cache to identify the old line and clear the SI or SD valid bit for the old line. The master cache may also perform a search of all the possible locations for the old SI or SD valid bit and clear this bit once it is found. This search can occur after the master has transferred the new data to the slave cache and has set the new SI or SD valid bit. This search could be delayed or avoided at the expense of additional interruptions to the slave cache because of false "hits" from old SI or SD valid bits that were not cleared.

If the modified bit 64 in the master cache is set, then the old line in the master must be written back to main memory 34. For simplicity, this is not shown in FIG. 5. The slave instruction cache never writes data, while the slave data cache is write-through, so the slave caches never have to copy a line back to the master cache, reducing complexity of the slave caches.

INVALIDATION, SNOOPING AND CACHE COHERENCY

The processor may issue an instruction to invalidate any lines in a cache that match a certain address or range of addresses. These invalidate instructions are usually defined by the architecture and are executed by a program or operating system to achieve multiprocessing or system security. In RISC instruction sets, the invalidate instruction may only provide a single line address for invalidation. A simple routine may be programmed that loops through a range of addresses, invalidating one line address at a time. Thus a specific page of addresses in the cache may be invalidated by looping through the entire range of possible addresses within the page.

Figure 6:
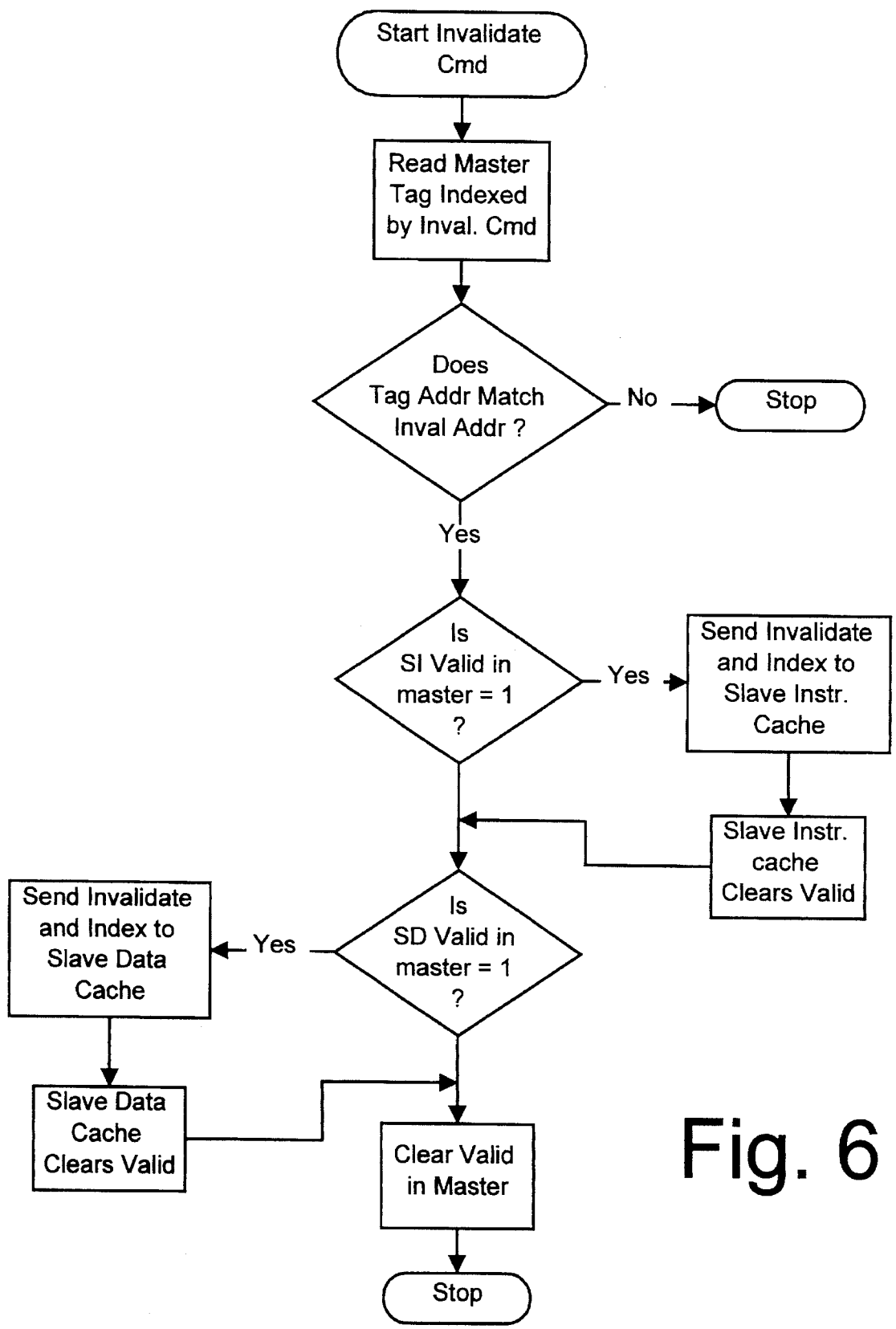
FIG. 6 is a flowchart for a simple invalidate instruction.

FIG. 6 is a flowchart for a simple invalidate instruction. The invalidate instruction is sent to the master cache when it is encountered by the processor's pipeline. The master cache breaks the address specified by the invalidate instruction, called the invalidate address, into a tag portion and an index portion. The index portion is used to select a subset of lines in the master cache, and each line's tag address is compared to the tag portion of the address. If a match is not found, then no further action is required since no line was found having the invalidate address. Since the slave caches cannot have a line which is not present in the master, the slave caches do not have to perform a separate invalidation lookup. This allows the slave caches to continue supplying the pipelines with operands and instructions rather than having to stop and perform an invalidation lookup.

If a line is found having an address tag that matches the invalidate address, and the master valid bit is set, then the master cache checks the slave valid bits that are stored in the master's tag, the SI valid bit 68 and the SD valid bit 70. If the SI valid bit 68 is set, then the master cache writes the tag in the slave instruction cache with the valid bit cleared, invalidating the line. The slave-cache index portion of the address is sent to the slave instruction cache to specify the particular line to invalidate in the slave instruction cache. The slave does not need the whole address, including the tag portion, since the slave is preferably direct-mapped. The master cache then clears the SI valid bit 68I in the slave instruction cache, which invalidates the line in the slave instruction cache.

The master also checks the SD valid bit 70 which is a copy of the slave data cache's valid bit. If the SD valid bit 70 is set, then the master cache instructs the slave data cache to invalidate the line. The slave-cache index portion of the address is sent to the slave data cache to specify the particular line to invalidate in the slave data cache. The master cache then clears the SD valid bit 70D in the slave data cache, which invalidates the line in the slave data cache. Finally the master clears all three valid bits in the master, the master valid bit 62, the SI valid bit 68, and the SD valid bit 70. This invalidates the line in the master cache.

Modern architectures allow for more than one processor and its associated caches. I/O devices may become bus masters and may update the main memory or demand exclusive control over a portion of main memory. A snooping mechanism is required to ensure coherency between the main memory and a plurality of caches and bus masters. A snoop request is similar to an invalidation instruction from the processor's pipeline, but the snoop request originates from an external device or snoop requester rather than from the processor's internal pipeline. A cacheable access by another processor or a bus master to main memory will cause a snoop request to the master cache. The snoop request will include a snoop address. A line found in the master cache corresponding to the snoop address is invalidated by clearing its valid bits. However, if the snoop request is a non-exclusive read that does not require invalidation, then the invalidation step is skipped. The line may have to be written back to the main memory if the line has been modified. While snoop requests are common, a snoop hit is rare. Thus snoop requests will frequently need to access the tags in the master cache to determine if a snoop hit has occurred, but invalidations of master cache lines will be much less frequent. Since the slave caches are only interrupted when a snoop hit occurs, and then only when one of the slave valid bits is set, these snoop requests will not require much of the slave's bandwidth since the master handles all of the snoop requests that miss the slave cache without interrupting the slave caches.

Figure 7:
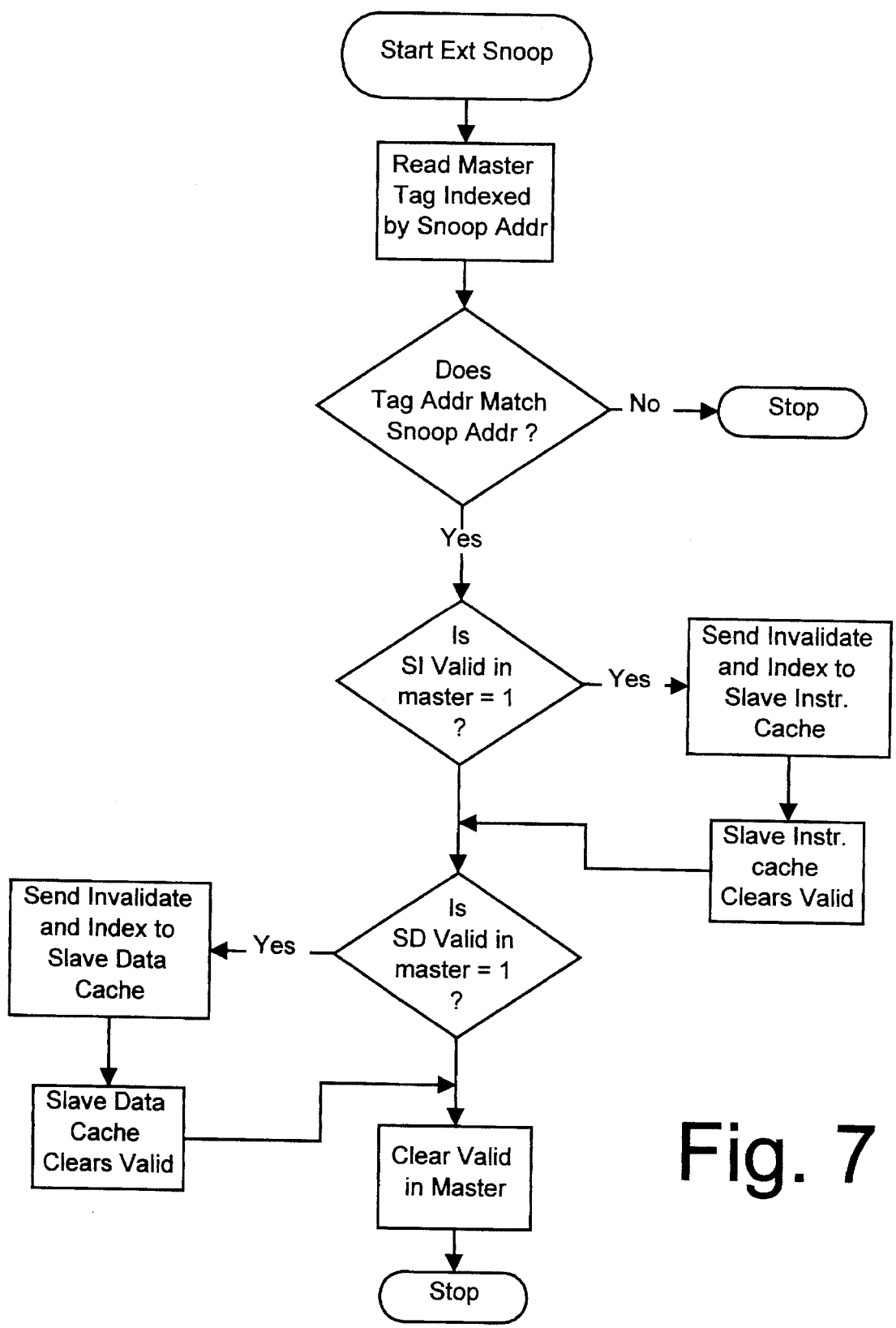
FIG. 7 is a flowchart of an external snoop operation.

FIG. 7 is a flowchart of an external snoop operation. The sequence of operations is similar to the sequence for an invalidation, as discussed for FIG. 6. The main difference is that the snoop address originates from an external source, while the invalidate address originates from within the processor's pipelines. Thus snoop requests may be handled by the master cache in a manner similar to the invalidation commands. Thus the design of the master cache is simplified.

More complex invalidate instructions may also be supported by extensions of these teachings. For example, an instruction that invalidates all lines in a cache having a specified index is very useful for quickly invalidating the entire cache by looping through the range of indexes in the master cache. Rather than compare the tag to the invalidate address, as shown in FIG. 6, the master cache would select the first line having the specified index, then check the SI valid bit and the SD valid bit as shown in FIG. 6, performing slave-cache line-invalidations if these bits are set. Finally the master clears all valid bits in the line. The master cache then selects the next line having the same index, and repeats these operations. The master cache may allow for all lines having a common index to be read and written in parallel. For example, an 8way set-associative master cache will have 8 lines to invalidate, requiring 8 lines to be read and written in parallel using the steps shown in the lower half of FIG. 6.

Because the cache of the present invention includes both a master cache and slave caches, the master cache can free the slave caches so they can supply the pipelines with data and instructions at the high bandwidth required. The master cache is also freed from having to supply both pipelines because the slaves only send requests to the master at a rate equal to the pipeline 'bandwidth multiplied by the miss rate of the slave cache. While the slave's miss rate is higher than for a larger cache, because the slave is designed for speed, the bandwidth of misses sent to the master is much lower than if the master had to supply the pipeline directly. For example, if the slave had a 10% miss rate, and supplied the pipeline every 7.5 ns cycle, then only 1 out of 10 cycles would result in a miss that would require access to the master cache. The master would see a miss from the slave only every 75 ns. Thus the master cache has many free clock cycles to perform cache coherency and external snoop cycles. The master cache can be designed to be two or three times slower than the slave caches, and still have enough surplus bandwidth to support snoop requests. If the master cache had an access time of 15 ns, and had to supply both slave caches every 75 ns, there would still be 75 ns–15 ns–15 ns=45 ns of unused time for snoops and coherency requests. Often the snoop must be responded to within a fixed period of time. In prior-art systems, a second, separate set of "snoop" tags was often needed so that snoop requests could be responded to within a fixed period of time without slowing the cache by using the cache tags for every snoop request. This second set of snoop tags is not necessary with the master-slave cache since the master has surplus bandwidth as it does not have to directly supply the processor's pipelines.

CACHE FLUSH

Figure 8:
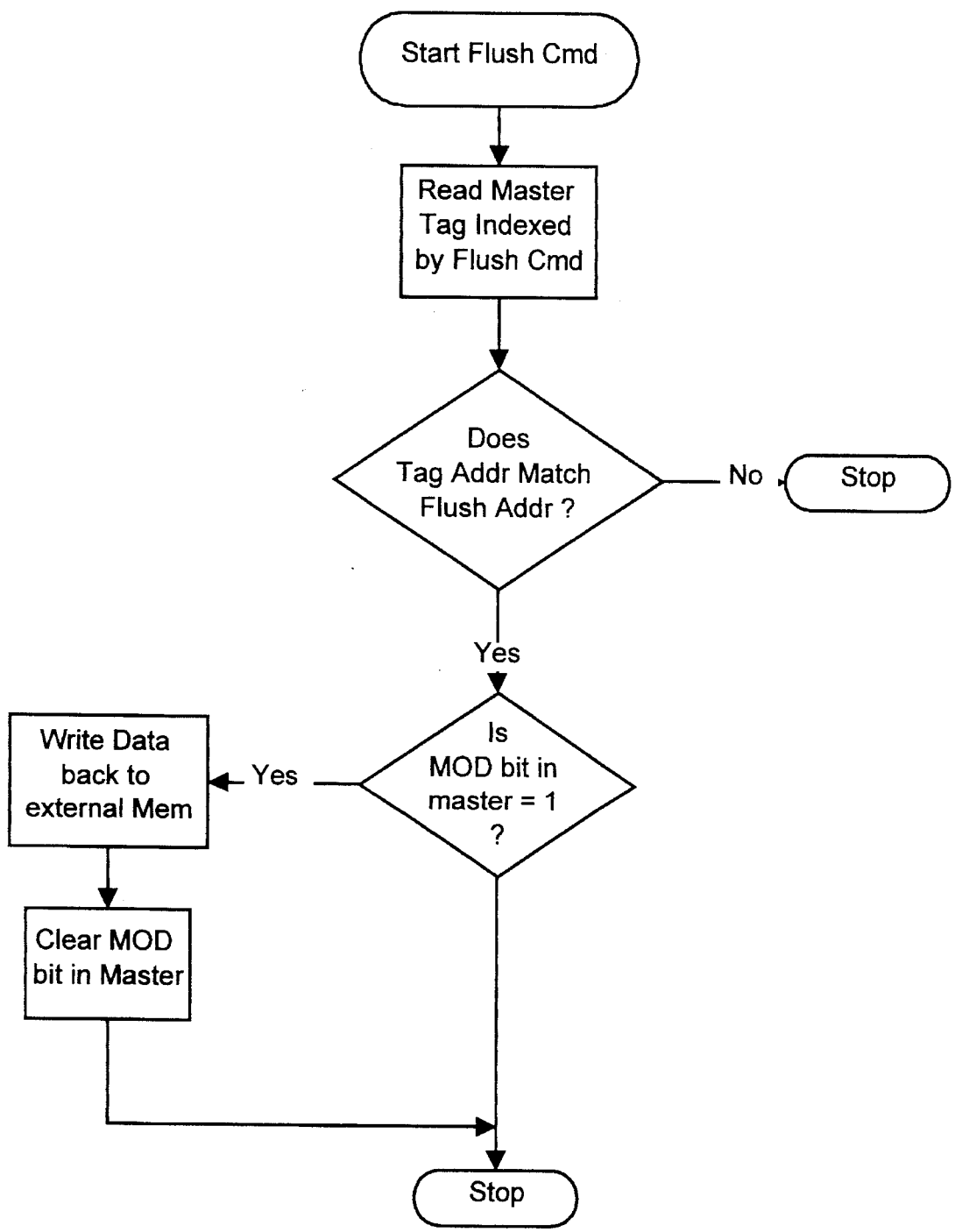
FIG. 8 is a flowchart for a cache flush operation.

FIG. 8 is a flowchart for a cache flush operation. A cache flush causes modified data in the cache to be written or copied back to the main memory or an external level-2 cache. A block of memory may be flushed by programming a loop that sequences through a range of addresses, performing the operations shown in FIG. 8 for each iteration of the loop.

The flush command will specify a flush address. This flush address is broken into a tag portion and an index portion. The index portion selects a set of associates in the master cache. Each of these associates in the set has its address tag field compared to the tag portion of the flush address. Typically these compares can be performed at the same time because the set-associative master cache has a comparator for each column of associates, and the total number of comparators is equal to the number of columns. If no valid matching tags are found, then the flush command is completed. However, if a valid matching tag is found, then the modified bit 64 in the master tag 72 is checked. If modified bit 64 is set, then the data in the selected line is written back to the main memory or level-2 cache and the flush command completes. If the modified bit 64 is not set, then no write-back operation is needed and the flush command completes. Since the slave caches are write-through, the master cache always contains an accurate copy of all the data in the slave caches. Consequently the slave caches are not interrupted by a flush command, saving the slave cache bandwidth for supplying the processor's pipelines.

Flushing may be combined with invalidation. In a multi-processing system another processor may request that a line be exclusive for its own use. The address of this line would be sent to the master cache, which would flush and invalidate this line if it were present in the master cache.

DATA CACHE BLOCK ZEROING

Figure 9:
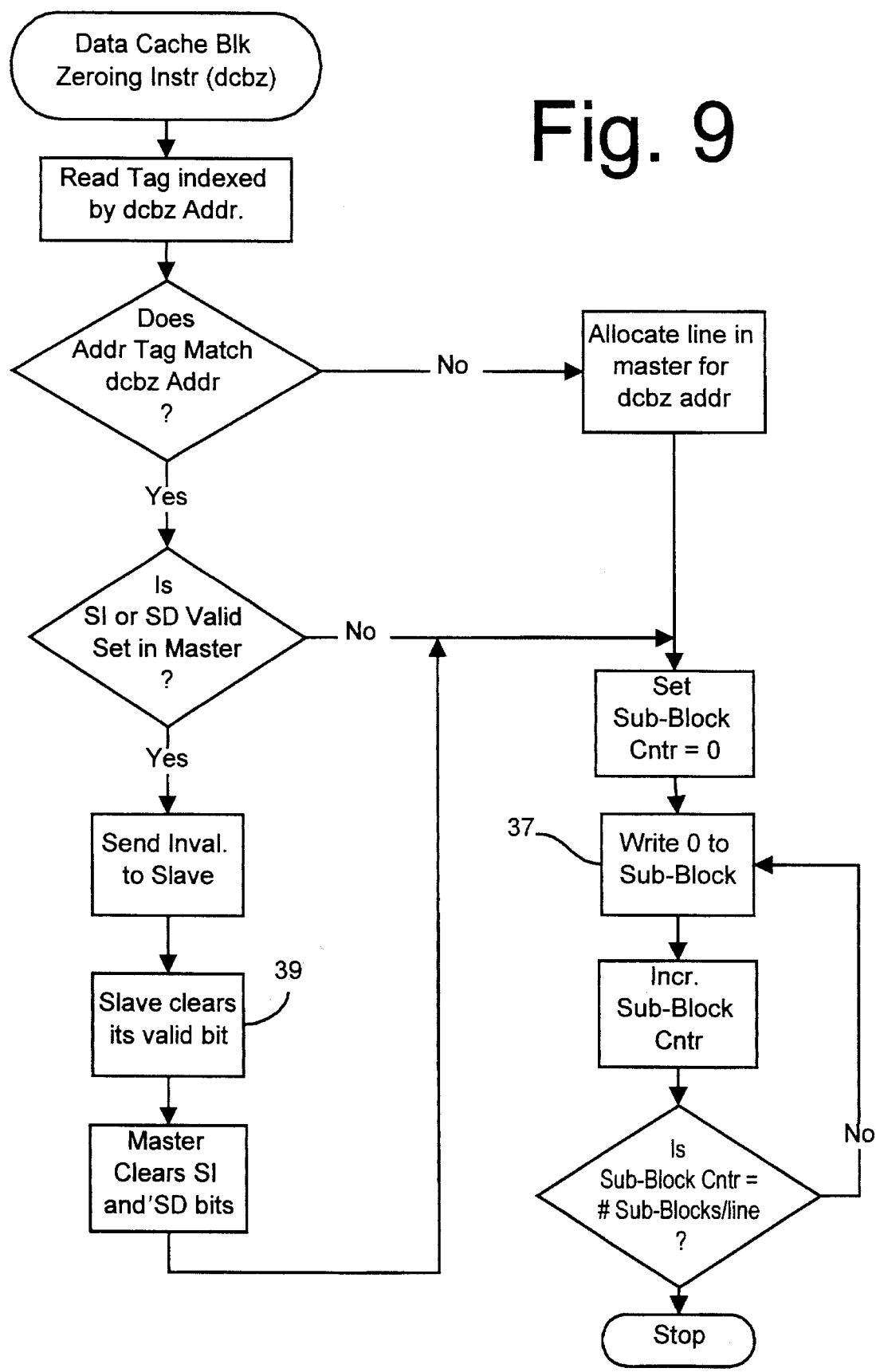
FIG. 9 is a flowchart for a data-cache-block-zero operation.

FIG. 9 is a flowchart for a data-cache-block-zero (dcbz) instruction. This is a RISC instruction in a popular commercial RISC instruction set and hence must be supported for certain commercial RISC processors. The dcbz instruction writes the value zero ("0×00" in hexadecimal notation) to all data bytes in a cache line corresponding to a dcbz address specified in the dcbz instruction. The dcbz instruction is an unusual but useful instruction. It can be used by the operating system for establishing a block of user memory in a cache that will later be written to by a user program. Since the block will be over-written by the program, the existing data in the block will be discarded and hence does not need to be fetched from main memory. The dcbz instruction can save many clock cycles that would be spent fetching the old data in the block from main memory and then overwriting that old data. Instead, the data in the memory block is simply initialized to the value zero in the cache. Once the program has finished writing new data to the memory block, it will then be written back to main memory, overwriting the data existing there. The exclusive bit 66 may be set so than no other master or external processor reads the stale data from the main memory, or other coherency mechanisms may be used.

FIG. 9 shows the sequence of operations supporting the dcbz instruction with the master-slave cache. As with invalidate and flush instructions, the dcbz instruction is sent to the master cache and doesn't interfere with the slave caches unless required for coherency. The dcbz address is broken into a tag portion and an index portion. The index portion is used to select a subset of addresses in the master cache while the tag portion is compared to the address tag 60 field of the master tag 72. If a matching line is found, then the SI valid bit 68 and the SD valid bit 70 are checked. If either (or both) slave cache's valid bit is set, then the master cache causes the slave cache to invalidate that line in the slave by sending an invalidation signal and the index portion to the slave cache. The master then clears the slave cache's valid bits (either the SI valid bit 68 or the SD valid bit 70 or both) in the master tag 72, but the master cache does not clear the master valid bit 62.

A sub-block counter is then initialized. A line in the master cache may contain one or more sub-blocks. The size of the sub-block is here defined as the number of bytes that can simultaneously have a zero written to them by the master cache. Typically the sub-block is the width of the data path or bus going into the master cache, but this can vary with the particular embodiment. All data bytes in the selected line are then zeroed by writing zero to each sub-block in the line and incrementing the sub-block counter until all bytes in the line have been written to.

If no line in the master cache was found that has a matching address tag, then a line must be allocated. One of the lines, preferably the least-recently-used line in the set, is selected having the same index as the index portion of the dcbz address. The data in the old line is written back to the main memory if the modified bit 64 is set, and the new address tag 60 is written to the master tag 72. The master valid bit 62 is set, and the exclusive bit 66 may also be set. The SI valid bit 68 and the SD valid bit 70 are cleared. The data in the line is then zeroed by initializing the sub-block counter and successively writing the value zero to each data byte in the line, one sub-block at a time.

The zeroing operation requires many clock cycles since the cache must first be searched and then successive bytes of data written with the value zero. In prior-art systems, the zeroing would stall the pipelines because the cache would be preoccupied with the zeroing operation. In the present invention, the pipelines do not stall, because the zeroing operation is performed in the master cache. The slave caches are therefore freed to supply the pipelines at the full bandwidth. The slave caches are interrupted only to perform a line invalidation once the search in the master cache locates a line to be zeroed that is present in the slave cache. The slower zeroing operation, which requires a loop of successive writes, is performed only in the master cache, not in the slave caches.

STORE TO INSTRUCTION STREAM

Figure 2:
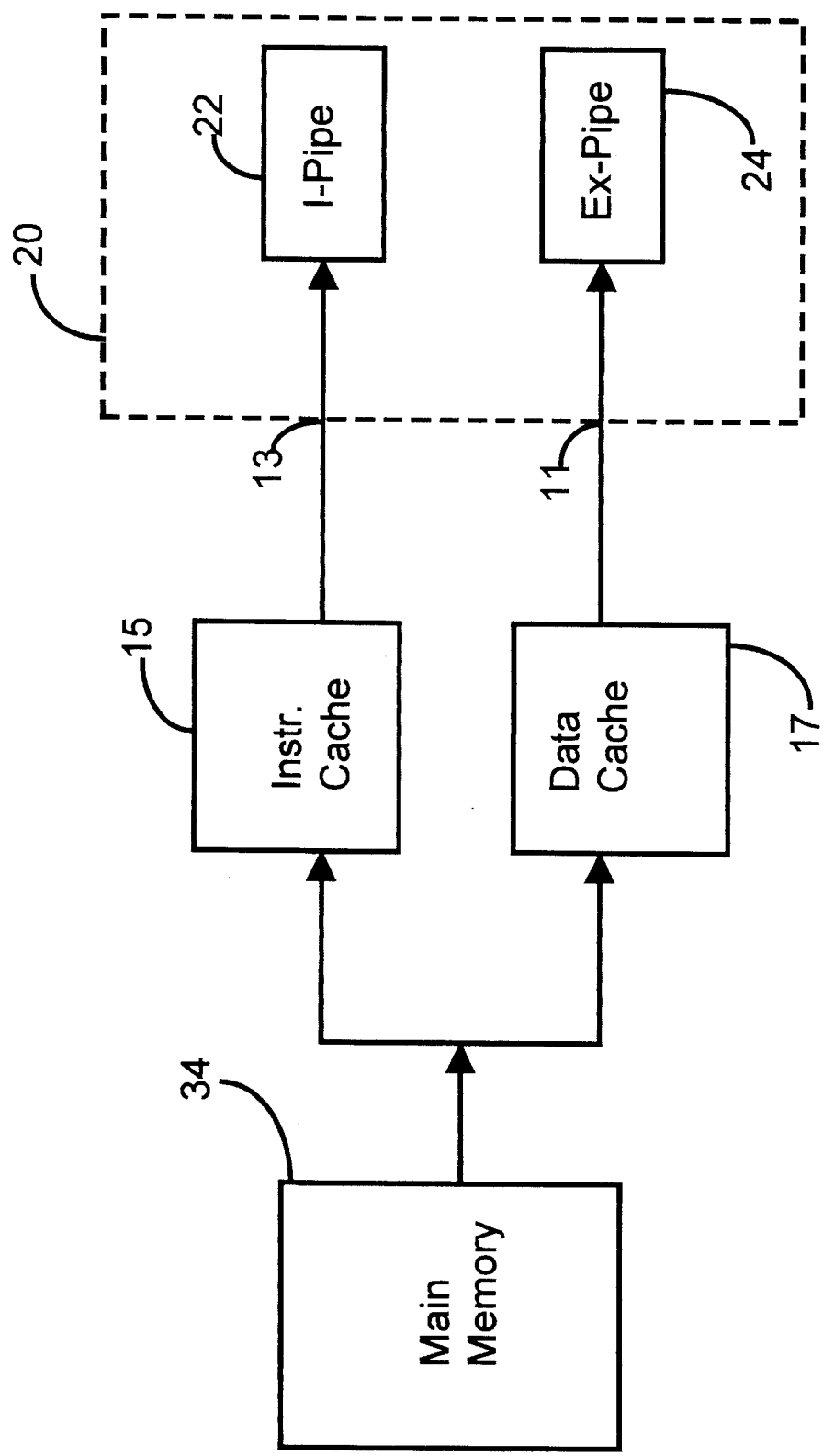
FIG. 2 is a diagram of a prior-art Harvard-architecture cache.

Architectures often require support for storing data operands into a block of memory that contains instruction code. This is known as a store to the instruction stream (STIS). Maintaining cache coherency can be difficult when a program stores into its instruction stream. Coherency is particularly difficult with the prior-art Harvard architecture, as shown in FIG. 2. Data stores are sent from the execution pipeline 24 to the data operand cache 17. However, the instruction stream is stored in the separate instruction cache 15. If the data operand that is being stored to the instruction stream has an address corresponding to a line that is currently stored in the instruction cache 15, then this data operand must be quickly written to main memory 34, and the corresponding line in the instruction cache 15 must be either updated with the data operand or invalidated. However, if the data cache is write-back, then the data operand might not be written back to the main memory for a long period of time, until the line is replaced in the data cache 17. Even write-through caches may have a write buffer, increasing the delay for the data operand to be written back to the main memory. Some type of coherency mechanism must be provided to detect a store to data cache 17 that corresponds to a line in instruction cache 15. Some type of path must be provided to update or invalidate the instruction cache when a store occurs in the data cache.

The master-slave cache is ideally suited for implementing a coherency scheme for store to instruction stream. Since the master cache has control over both the slave instruction cache and the slave data cache, the master cache can easily detect a store to the instruction stream and perform the necessary coherency tasks. The master-slave cache can implement a policy of never having a line present in both of the slave caches at any one time. Thus if a line is present in the slave instruction cache, and the execution pipeline performs a read or a write to this same line, the line will not be present in the slave data cache since it is already present in the slave instruction cache. A miss will occur in the slave data cache and the data will be requested from the master cache. However, when the master cache reads the master tag of the line, the master cache will detect that the SI valid bit is already set. The master cache then sends an invalidate signal to the slave instruction cache and sends the index of the line. The slave instruction cache then clears its valid bit, which invalidates the line in the slave instruction cache. The master cache clears the SI valid bit and sets the SD valid bit in the master tag. The master cache sends the data to the slave data cache, and the slave data cache writes the new address tag and sets its valid bit.

Figure 10:
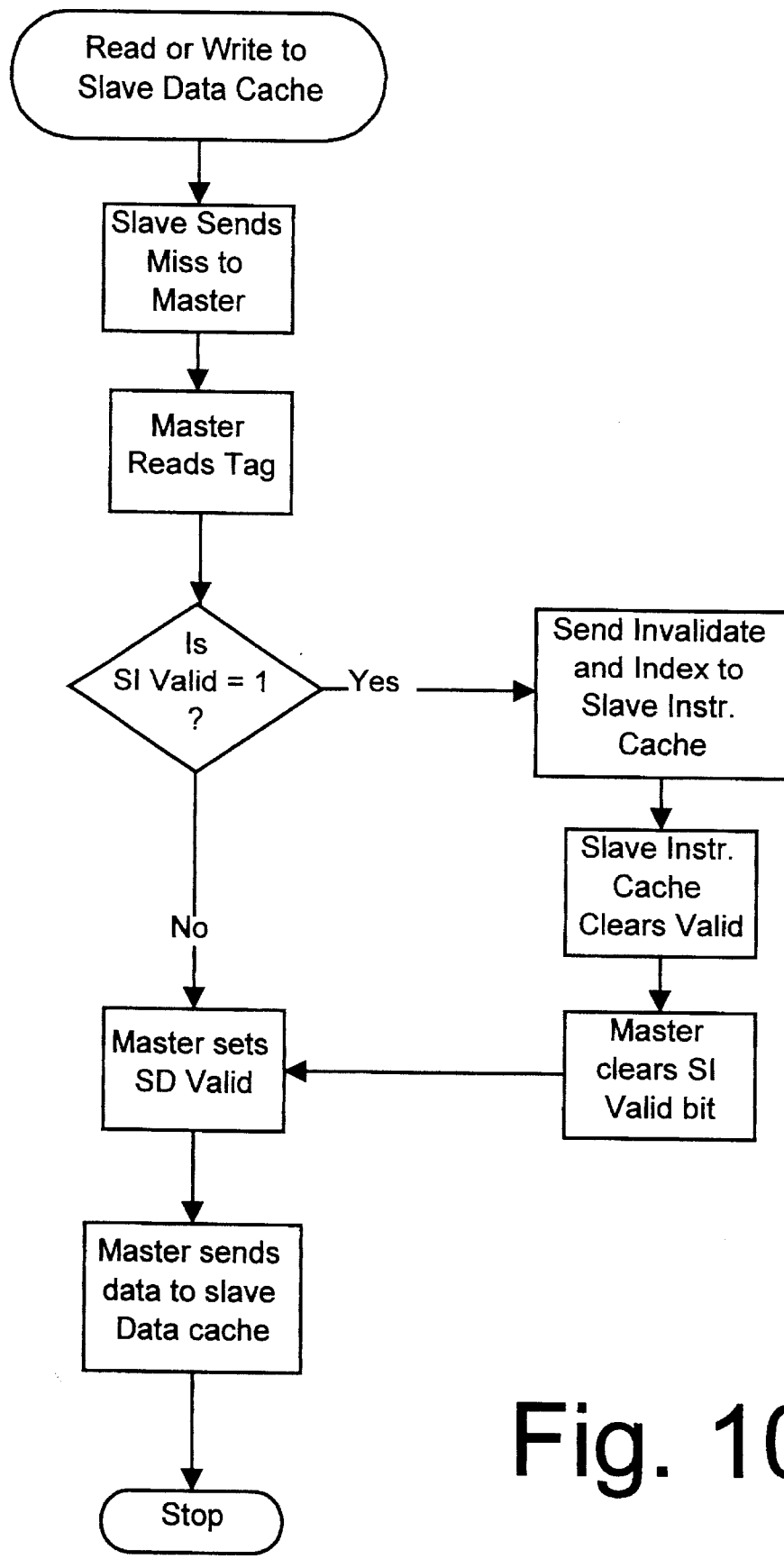
FIG. 10 is a flowchart for a store-to-instruction-stream operation.

The policy of never having a line present in both of the slave caches at any particular time can be selectively enabled or disabled. This allows for efficient store-to-instruction-stream for certain types of programs but not for other types. FIG. 10 shows a flowchart for a read or write operation from the execution pipeline to the slave data cache, for the particular example of a STIS where the line is present in the slave instruction cache. The slave data cache misses, and sends a request to the master cache. The master reads the master tag, but first checks the slave valid bit for the other slave, the SI valid bit. If the SI valid bit is set, a STIS has been detected. The master then sends an invalidate signal to the slave instruction cache together with the index of the line. The slave instruction cache invalidates the line. The master can then allocate the line to the slave data cache by clearing the SI valid bit and setting the SD valid bit in the master tag. The data is finally sent to the slave data cache from the master cache.

In the above case, the master cache detected the STIS when the slave data cache requested a line, and the SI valid bit was already set. This very simple detection method can also signal when to flush the instruction pipeline. If the master cache detects a store from the slave data cache to a line present in the slave instruction cache, the master cache must invalidate the line in the slave instruction cache. It is also possible that the instruction pipeline of the processor has a copy of or a part of the line. Depending upon the architectural requirements for STIS, the master cache may also send a pipeline invalidate signal to the instruction pipeline to prevent it from using potentially stale data. The master-slave cache is ideally suited for detecting the STIS because the master tag includes the slave cache valid bits. Additionally, the slave instruction cache is not disturbed unless the STIS is detected. This allows the slave instruction cache to supply the instruction pipeline without interruption, at the full bandwidth required. The master cache only interrupts the slave instruction cache after the STIS is detected, not every time coherency must be checked.

The slave instruction cache may also request a line that is stored in the slave data cache. In this case, the master cache will detect that the SD valid bit is set, and send an invalidation and the index to the slave data cache before allocating the line to the slave instruction cache. However, since the instruction pipeline only reads data, a STIS is not signaled, and no flush is required.

STORE QUEUE

In a highly-pipelined processor, a store queue is often necessary. The store queue holds data operands from the execution pipeline that are to be written out to the cache or memory. The store queue is a useful structure for buffering stores to the cache and main memory. Often the slave data cache will be busy processing a read request from the pipeline, preventing the store from being immediately written to the slave data cache. The store queue can hold the store data until the slave data cache has a free cycle. The store queue may be several words deep, allowing it to buffer several stores simultaneously. Store queues such as this are well-known in the prior art.

Since the master cache is tightly coupled to the slave data cache, the store queue may be shared between the master cache and the slave data cache. Because the slave data cache is preferably write-through, lines do not have to be copied back to the master cache after a miss occurs and an old line is replaced. If the store data from the execution pipeline is written to both the slave data cache and the master cache via the store queue, the slave data cache does not need a separate mechanism for writing-through to the master cache. This helps to reduce complexity of the master-slave cache and saves space by sharing store queue storage.

Figure 11:
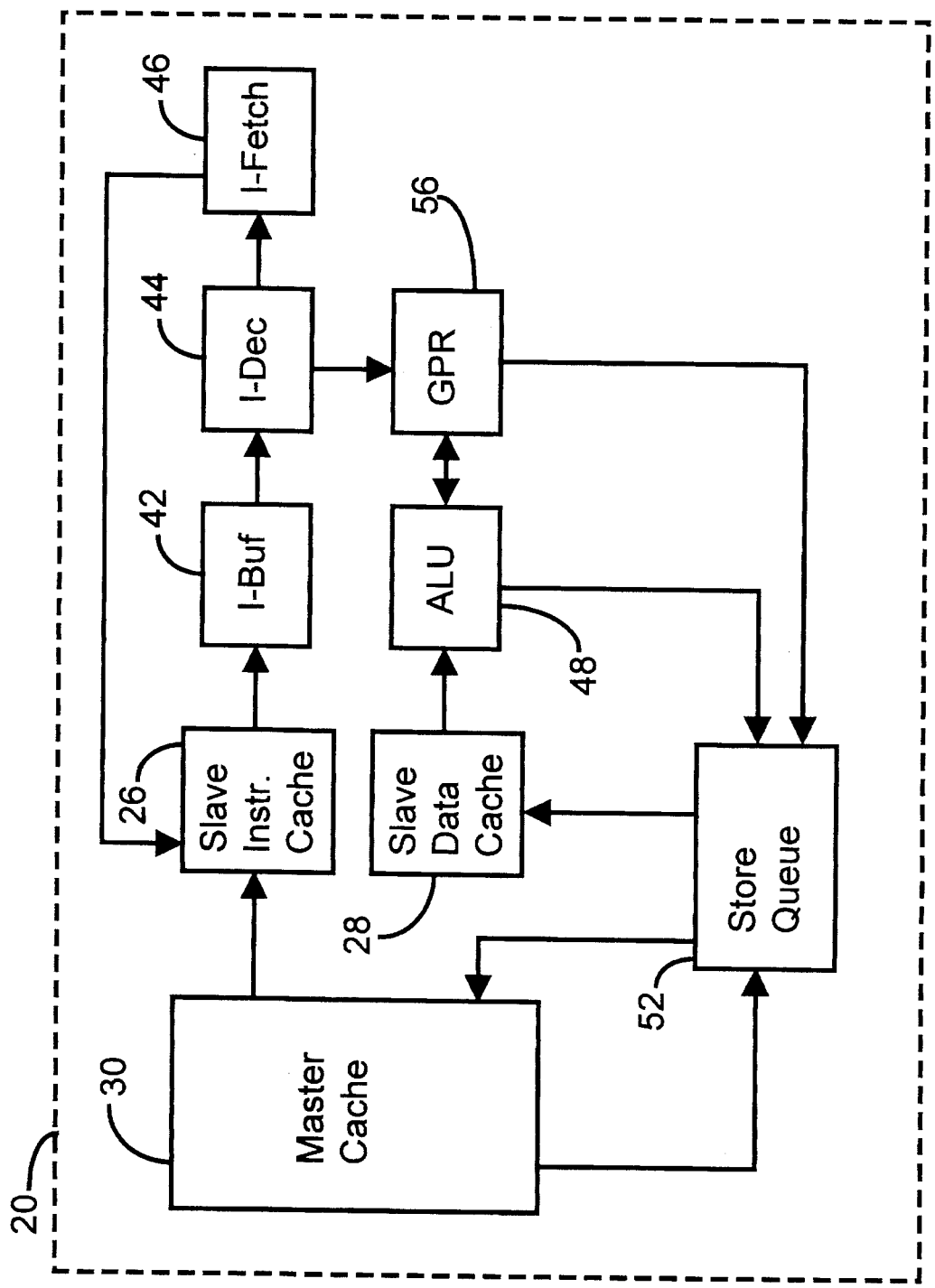
FIG. 11 shows the store queue within the microprocessor die.

FIG. 11 shows the store queue 52 within microprocessor die 20. The slave instruction cache 26 supplies instruction words to the instruction pipeline, which includes instruction buffer 42, instruction decoder 44, and instruction fetcher 46. Instruction decoder 44 is the last stage of the instruction pipeline, and feeds decoded instructions to the execute pipeline. The execution pipeline includes general-purpose registers 56, which contain temporary storage areas visible to and available for use by programs. The general-purpose registers 56 feed operands to an arithmetic-logic unit (ALU) 48, which performs an operation on the data operands. Data operands may be selected from the general-purpose registers 56, or from memory. Memory operands are supplied by slave data cache 28. ALU 48 may write the result of the operation back into the general-purpose registers 56, or the result may be written to memory. The operation that the ALU executes may simply be to move data from the general-purpose registers 56 and store that data to the memory. The store data is transferred to the store queue 52 from either the ALU 48 or directly from the general-purpose registers 56. Data in the store queue 52 is then written to the slave data cache 28, and to the master cache 30.

Once data is placed in the store queue 52, the actual write operations to the master cache 30 and the slave data cache 28 could occur at slightly different times, depending when a free cycle occurs for the master cache 30 and for the slave data cache 28. Master cache 30 could have many free cycles, allowing several stores to be written to the master cache 30 before even the first store is written to the slave data cache 28, or the reverse may be true. A policy of allocate on write for the slave data cache 28 would require added complexity. Therefore stores that miss in the slave data cache 28 preferably do not cause a new line to be allocated to the slave data cache 28. Rather, the store data are simply not written to the slave data cache 28 but are written only to the master cache 30. Thus some of the stores in the store queue 52 will not be written to the slave data cache 28. However, all stores are written to the master cache 30.

Figure 13:
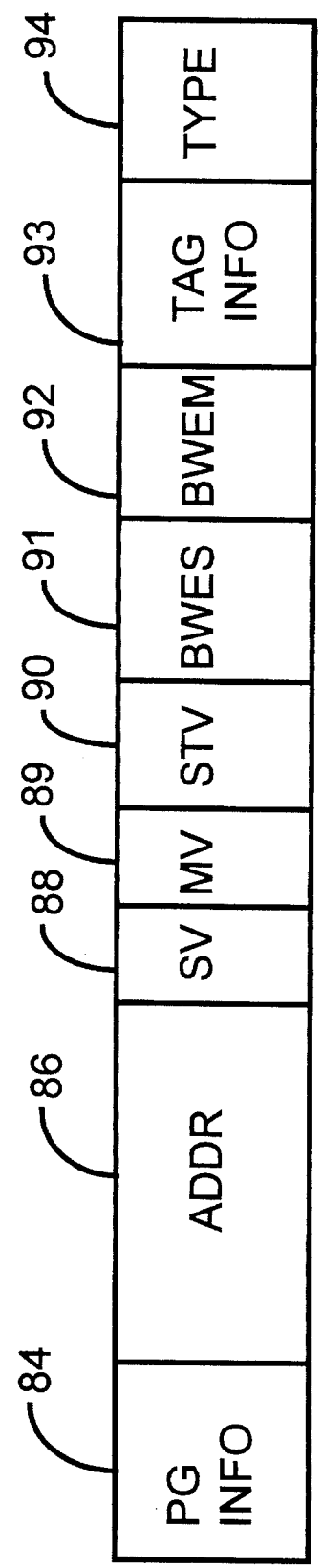
FIG. 13 is a diagram of a store queue tag.

FIG. 13 is a diagram of a store queue tag. The store queue 52 contains fields for the store data (not shown) and a store queue tag. These store queue tags are similar to cache tag fields. The store queue tag includes an address field 86 for the address of the store. Page information field 84 specifies if the store data is to a page in memory that is write-through, guarded, cacheable, or coherent. The store queue 52 also includes bits 88, 89 to indicate if the store data needs to be been written to the master cache 30, or to the slave data cache 28. These bits are necessary since the writing to either cache may occur in any order. A slave-tag-valid bit 90 is used to indicate that the store data is a line fill from the master cache, and that the address tag in the slave data cache 28 must also be updated when the data is written. Two byte enable fields, 91, 92 specify which bytes are valid for the slave and master, allowing merges of bytes for multiple writes. Tag information field 93 may contain parity, sub-line validity, or other information. Type field 94 specifies if the store queue entry is a normal write from the execution pipeline, or if it contains a cache operation such as an invalidate request or zeroing operation from the CPU.

Instead of having a separate fill buffer for fill data from the master cache, the store queue is used as the fill buffer. A large savings in hardware results because address compare and bypass logic in the store queue is shared with the fill buffer. The storage space in the store queue may be dynamically allocated between fill data and write data, resulting in a more efficient use of processor resources.

The store queue 52 is the only path for store data from the execution pipeline to be written out to the master cache 30 and the slave data cache 28. In addition, the store queue can be used to write data from the master cache 30 to the slave data cache 28. Thus the store queue can also act as a fill buffer known in the prior art. This eliminates the need for a second write port into the slave data cache 28. Data from the master cache can bypass the store data in the store queue 52 when necessary, as when the store queue is full. Invalidations and reads must first check the store queue 52 to see if a line is present in the store queue 52. If an address match occurs, then the store queue must be emptied out or invalidated before the data may be read, or the invalidation is performed. For reads, data from the store queue 52 is preferably wrapped or bypassed onto the slave data cache output when a store queue hit is detected.

An invalidation instruction that is detected by the execute pipeline can also use the store queue 52 to send the invalidation request to the master cache. A cache management operation bit in the store queue, encoded in type field 94, is set by the CPU to indicate that the store data is actually a cache management operation. The type of operation, data-block zero, invalidation, search, etc., may be encoded in the data field in the store queue, while the address field holds the invalidation or zeroing address for which the master cache searches. Thus the store queue may be used to send cache management operations directly to the master cache. The store queue is shared by both the master cache and the slave data cache.

The close coupling of the master cache 30 and the slave data cache 28 allows the store queue 52 to be shared between the master cache and the slave data cache. Sharing the store queue eliminates having to have a second store queue for the master cache 30. Cache management requests are communicated from the execution pipeline to the master cache using the shared store queue. Stores may be merged together in the store queue before being written to the master or slave cache, reducing bandwidth for writes.

MASTER PREFETCH

Most modern processors employ some form of prefetching of instructions and/or data before they are requested. Prefetching of instructions is the most common, so it will be described, although the teachings herein disclosed may be applied by those of skill in the art to data prefetching. The master-slave cache performs all prefetching into the master cache rather than into the slave instruction cache. This frees the slave instruction cache from the complexity of prefetching. Because some of the prefetched instructions will not be used, some bandwidth is wasted when prefetching. Since the master cache is so closely coupled to the slave instruction cache, the miss penalty from the slave instruction cache is small. The slave miss penalty is especially small when compared to the miss penalty from the master cache, which requires that memory off the microprocessor die be accessed. Therefore prefetching into the master cache greatly reduces the miss penalty as instruction words are fetched into the slave instruction cache.

Many prefetching schemes may be implemented in the master cache. The master cache may be coupled directly to the instruction pipeline to receive the current instruction pointer value, and branching information from the instruction decoder 44. However, in the preferred embodiment, the master cache starts prefetching when a miss request is processed from the slave instruction cache. The master cache stores the address of the miss from the slave instruction cache, and increments this address. If the incremented address, the prefetch address, is not present in the master cache, then the corresponding line will be fetched from main memory. The prefetch address is then incremented again, and the next sequential line is fetched from main memory if not already present in the master cache. The sequential prefetching continues until a hit in the master cache, or until another miss occurs from the slave instruction cache, reloading the prefetch address. If a page boundary is reached before the next master cache prefetch hit or slave-cache miss occurs, then prefetching will stop. Other enhanced prefetching schemes may be employed, such as tagged prefetch, where a prefetched bit in the master tag is set when the next sequential line is prefetched. Tagged prefetch can prevent prefetching the same line multiple times. Other prefetching schemes may also use bits in the master tag.

The prefetched data in the master cache may easily be pre-loaded into the slave instruction cache. Since the slave instruction cache cannot be written by the instruction pipeline, the master cache has complete control over writing words to the slave instruction cache and updating the slave cache tags. The master cache may directly control signals to write the tag and data into the slave instruction cache. The master may chose to pre-load into the slave a line that has been prefetched into the master cache. The master may even implement a scheme that keeps statistical data on how frequently or recently lines were used in the slave instruction cache.

CONCLUSION AND ADVANTAGES

The master-slave cache allows for supplying the pipelines of a processor at the full bandwidth required because the small slave caches have a fast access time and are not repeatedly interrupted for cache management and coherency operations. The large master cache performs all searching and zeroing required by coherency, snooping, and block-zero requests, and detects stores into the instruction stream. The master only interrupts the slaves when a requested line is detected in the master cache and is also present in a slave cache. The master cache can have a large size, and have a complex organization, such as set-associative, accomplishing a low miss rate for the master-slave cache. In addition to these benefits, the master cache may be slower than the slaves, saving power by being designed from slower RAM blocks. Power savings results from using the well-known power-delay tradeoff. The master cache may also employ other power-savings features, such as a power-down mode that detects periods of time when the master cache is not being accessed, and shuts down the sense amplifiers and other power-hungry circuits in the cache RAM.

ALTERNATE EMBODIMENTS

Several other embodiments are contemplated by the inventors. For example the master cache may simultaneously check and send invalidation requests to both the slave instruction cache and the slave data cache. The master cache is preferably constructed from RAM cells, while the slaves are RAM-based and designed for speed, although many other implementations are possible. The preferred embodiment uses three separate valid bits for indicating if a line is valid in the master cache and the two slave caches. However, these valid bits could be encoded as a multi-bit field and still indicate validity of the lines in both the master and slave caches. The valid bits could also be encoded together with the modified and exclusive bits, or with other bits in the master tag. Likewise, the various bits in the store queue could also be combined and encoded together. In a preferred embodiment, the slave cache valid bits are stored with the least-recently-used (LRU) bits, which are stored in a common tag field which contains LRU information for all set-associate lines having the same index. Thus when the LRU bits are consulted to select which line should be replaced to make room for a new line, the slave cache valid bits may also be consulted. Any line having a slave cache valid bit set would not be replaced, even if it is the least-recently used line. The slave cache lines are always kept most-recently used in this manner.

While a specific embodiment has been described having two slave caches that supply the two processor pipelines, for instructions and for data operands, processors with more than two pipelines would especially benefit from application of the teachings of the invention. For example, a super-scalar processor might have seven pipelines—one instruction pipeline just for branches and three execution pipelines each having their own instruction pipeline. Three, four, or more slave caches could be used to supply these pipelines. Additional valid bits or equivalent means for the additional slave caches could be added to the master cache tag. A floating point unit might have its own pipeline, and could also benefit from having its own slave cache supply it with operands.

The slave caches and store queue may be organized in different ways, and the slave instruction cache could include buffering similar to the store queue to allow it to defer line fills from the master cache. The buses between the master cache and the slave caches could be separate busses as described, or a shared bus could be used. An embodiment has been described with valid bits in the master indicating if an instruction or data word is present in one of the slave caches. Another embodiment does not require that the slave valid bits in the master indicate that an instruction or data word is definitely present in the slave. It is enough that the slave valid bit in the master indicate that the instruction or data word might be present in the slave cache. This embodiment relaxes the coherency requirement between the slave caches and the slave valid bits in the master cache, at the expense of some additional invalidations being sent to the slave caches for instruction or data words that might be present in the slave caches but are actually not present in the slave caches.

The invention has been described as a cache using physical addresses. Caches using virtual addresses are also well-known in the art and the invention could be modified to use virtual addresses rather than physical addresses. Direct-memory access (DMA) may also be combined with the invention allowing DMA access to the master cache through a separate DMA channel. The master cache would handle all DMA cycles, only interrupting the slave caches when necessary, when a slave valid bit is set.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A master-slave cache system for transferring data between a main memory and a central processing unit (CPU), the CPU having an instruction pipeline decoding instructions at a first rate, the CPU having an execution pipeline executing at a second rate, the main memory storing a plurality of operands and a plurality of instructions, the system comprising:

a master cache for storing operands and instructions, the master cache coupled to the main memory, the master cache storing a first subset of the plurality of operands and a second subset of the plurality of instructions stored in the main memory, the master cache storing a third subset of instructions and a fourth subset of operands, the third subset being a subset of the second subset, and the fourth subset being a subset of the first subset;

a slave instruction cache, coupled to the master cache and coupled to the instruction pipeline, for storing the third subset of instructions, the slave instruction cache capable of transferring instructions to the instruction pipeline at the first rate, the slave instruction cache comprising a cache that is read-only by the CPU; and a slave data cache, coupled to the master cache and coupled to the execution pipeline, for storing the fourth subset of operands, the slave data cache capable of transferring operands to the execution pipeline at the second rate;

wherein the master cache comprises a set-associative cache, and the slave instruction cache and the slave data cache comprise direct-mapped caches;

wherein the master cache further includes means for replacing operands and instructions using a modified least-recently-used algorithm, never replacing a least-recently used operand or instruction that is present in the slave data cache or the slave instruction cache, whereby the slave instruction cache matches the first rate required by the instruction pipeline, and the slave data cache matches the second rate required by the execution pipeline.

2. The system of claim 1 wherein the master cache has a capacity to contain at least four times a maximum number of operands and instructions that can be stored in both the slave data cache and the slave instruction cache.

3. The system of claim 1 wherein the slave data cache comprises a write-through cache, the slave data cache for writing a copy of an operand back into the master cache when the execution pipeline writes the operand to the slave data cache.

4. The system of claim 1 wherein the first subset and the second subset overlap, wherein an overlapping operand in the first subset that has an address matching an address of an instruction in the second subset indicates that the overlapping operand is being stored to an instruction stream stored in the plurality of instructions.

5. The system of claim 1 further comprising:

prefetching means, coupled to the master cache, for fetching instructions from the main memory into the master cache, the prefetching means fetching instructions having sequential addresses following a miss address from the slave instruction cache.

6. A master-slave cache system for transferring data between a main memory and a central processing unit (CPU), the CPU having an instruction pipeline decoding instructions at a first rate, the CPU having an execution pipeline executing at a second rate, the main memory storing a plurality of operands and a plurality of instructions, the system comprising:

a master cache for storing operands and instructions, the master cache coupled to the main memory, the master cache storing a first subset of the plurality of operands and a second subset of the plurality of instructions stored in the main memory, the master cache storing a third subset of instructions and a fourth subset of operands, the third subset being a subset of the second subset, and the fourth subset being a subset of the first subset;

a slave instruction cache, coupled to the master cache and coupled to the instruction pipeline, for storing the third subset of instructions, the slave instruction cache capable of transferring instructions to the instruction pipeline at the first rate;

a slave data cache, coupled to the master cache and coupled to the execution pipeline, for storing the fourth subset of operands, the slave data cache capable of transferring operands to the execution pipeline at the second rate;

a plurality of master tags, stored in the master cache, each master tag in the plurality of master tags comprising:

an address tag field, for storing a tag portion of an address of a data item, the data item being one of the plurality of operands or one of the plurality of instructions stored in main memory;

master valid indicating means for indicating that the data item is valid and present in the master cache;

slave-instruction valid indicating means for indicating that the data item is valid and present in the slave instruction cache; and slave-data valid indicating means for indicating that the data item is valid and present in the slave data cache, invalidation means, coupled to the master cache and to the CPU, for modifying the plurality of master tags;

the CPU including means for providing an invalidation address to the invalidation means;

the invalidation means further including:

means for signaling an invalidation hit if a tag portion of the invalidation address matches the address tag field in a matching line in the plurality of master tags;

master invalidating means for invalidating the data item in the matching line in the master cache if the invalidation hit is signaled and the master valid indicating means indicates that the data item is valid and present in the master cache;

first invalidating means for invalidating a first copy of the data item in the slave data cache if the invalidation hit is signaled and the slave-data valid indicating means indicates that the first copy of the data item is valid and present in the slave data cache; and second invalidating means for invalidating a second copy of the data item in the slave instruction cache if the invalidation hit is signaled and the slave-instruction valid indicating means indicates that the second copy of the data item is valid and present in the slave instruction cache, whereby the master cache contains information on valid words present in the slave instruction cache and the slave data cache and the slave instruction cache matches the first rate required by the instruction pipeline, and the slave data cache matches the second rate required by the execution pipeline and whereby all invalidation requests from the CPU are processed by the master cache.

7. The system of claim 6 further including an external snoop requester coupled to the invalidation means, the external snoop requester providing an external snoop address to the invalidation means.

8. The system of claim 7 further comprising means for signaling a snoop hit if the tag portion of the external snoop address matches the address tag field in a snooped line in the plurality of master tags;

the master invalidating means invalidating the data item in the snooped line in the master cache if the snoop hit is signaled and the master valid indicating means indicates that the data item is valid and present in the master cache;

the first invalidating means invalidating the first copy of the data item in the slave data cache if the snoop hit is signaled and the slave-data valid indicating means indicates that the first copy of the data item is valid and present in the slave data cache; and the second invalidating means invalidating the second copy of the data item in the slave instruction cache if the snoop hit is signaled and the slave-instruction valid indicating means indicates that the second copy of the data item is valid and present in the slave instruction cache, whereby all snoop requests from the external snoop requester are processed by the master cache.

9. The system of claim 6 wherein the first copy of the data item in the slave data cache and the second copy of the data item in the slave instruction cache can not both be valid at the same time.

10. The system of claim 9 wherein the first invalidating means invalidates the first copy of the data item in the slave data cache when the slave instruction cache requests that the second copy of the data item be validated and placed in the slave instruction cache; and the second invalidating means invalidates the second copy of the data item in the slave instruction cache when the slave data cache requests that the first copy of the data item be validated and placed in the slave data cache, thereby keeping the slave instruction cache and the slave data cache coherent and allowing a store to the instruction stream.

11. The system of claim 10 wherein the master cache signals a pipe-flush to the CPU when the execution pipeline writes to the data item and the slave instruction valid indicating means indicates that the second copy of the data item is valid and present in the slave instruction cache;

the instruction pipeline being flushed when the pipe-flush is signaled.

12. The system of claim 6 further comprising a store queue, the store queue further comprising:

means for receiving store data and an address of the store data from the execution pipeline;

means for writing store data to the master cache when the master cache is not busy;

means for writing store data to the slave data cache if the address of the store data matches an address of an operand in the slave data cache and the slave data cache is not busy; and means for storing a plurality of store data and a plurality of addresses of the store data, whereby the store queue is shared between the master cache and the slave data cache, the store queue receiving store data from the execution pipeline and writing the store data when the master cache and the slave data cache are each not busy.

13. The system of claim 12 wherein the execution pipeline uses the store queue to write store data to the slave data cache and to the master cache, eliminating a need for the slave data cache to write through to the master cache.

14. The system of claim 13 wherein invalidation and cache management operations from the CPU are placed in the store queue and written only to the master cache and not to the slave data cache, the master cache performing invalidation and cache management operations for the slave data cache.

15. The master-slave cache system of claim 6 further comprising:

selecting means for selecting a selected line in the master cache using a portion of a zeroing address;

reading means for reading the address tag field in the master tag for the selected line and allocating a new line in the master cache if the address tag field does not match a tag portion of the zeroing address;

signal means for sending an invalidation signal to the slave instruction cache if the slave-instruction valid indicating means in the master tag for the selected line indicates that the data item in the selected line is valid and present in the slave instruction cache, the slave instruction cache invalidating its copy of the selected line in response to the invalidation signal; and zero means for successively writing a zero value to all bytes of data in the selected line in the master cache, whereby the cache block is zeroed in the master cache without interrupting the slave instruction cache except when the copy of the selected line is in the slave instruction cache.

16. The master-slave cache system of claim 6 further comprising:

selecting means for selecting a selected line in the master cache using a portion of a zeroing address;

reading means for reading the address tag field in the master tag for the selected line and allocating a new line in the master cache if the address tag field does not match a tag portion of the zeroing address;

signal means for sending an invalidation signal to the slave data cache if the slave-data valid indicating means in the master tag for the selected line indicates that the data item in the selected line is valid and present in the slave data cache, the slave data cache invalidating its copy of the selected line in response to the invalidation signal; and zero means for successively writing a zero value to all bytes of data in the selected line in the master cache, whereby the cache block is zeroed in the master cache without interrupting the slave data cache except when the copy of the selected line is in the slave data cache.

* * * * *